United States Patent [19]

Dunn et al.

[11] Patent Number: 6,072,793

[45] Date of Patent: *Jun. 6, 2000

[54] ELECTRONICALLY CONTROLLED MAIN DISTRIBUTING FRAME

[75] Inventors: James Patrick Dunn, Northville Township, LaSalle County; William Brohmer Paulson, Lisle Township, Dupages County; Carl Robert Posthuma, Wheaton; Dorothy Voytko Stanley, Warrenville, all of Ill.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,026

[22] Filed: Jun. 12, 1997

[51] Int. Cl.[7] .......................... H04L 12/66; H04L 12/16; H04M 3/42
[52] U.S. Cl. .......................... 370/352; 370/259; 379/201
[58] Field of Search .................... 370/352, 351, 370/353, 354, 360, 389, 392, 422, 259; 379/201, 221, 243

[56] References Cited

U.S. PATENT DOCUMENTS

| | | |
|---|---|---|
| 4,876,711 | 10/1989 | Curtin ............................ 379/94 |
| 5,214,692 | 5/1993 | Chack et al. ..................... 379/265 |
| 5,550,912 | 8/1996 | Akinpelu et al. ................. 379/221 |
| 5,619,562 | 4/1997 | Maurer et al. ................... 379/201 |
| 5,673,255 | 9/1997 | Dunn et al. ...................... 370/244 |
| 5,712,908 | 1/1998 | Brinkman et al. ................ 379/119 |
| 5,740,239 | 4/1998 | Bhagat et al. ................... 379/243 |
| 5,796,718 | 8/1998 | Caterisano ....................... 370/217 |
| 5,801,921 | 9/1998 | Miller ............................ 361/686 |
| 5,870,529 | 2/1999 | Fukuda ........................... 395/80 |

*Primary Examiner*—Ajit Patel
*Assistant Examiner*—Brian Nguyen
*Attorney, Agent, or Firm*—Werner Ulrich

[57] ABSTRACT

An electronically controlled main distributing frame (ECMDF) establishes main distributing frame (MDF) type connection in response to control signals without requiring a craftsperson to connect a jumper wire. In accordance with one application of such ECMDF, a local switch can receive signals from a customer requesting connection to a specials service provider such as the Internet. In response to the receipt of such signals, the connection in the ECMDF is altered to provide a more direct connection to the service provider bypassing the local switch. Advantageously, such an arrangement allows the long holding times of Internet connections to be established through a bypass network while allowing the customers who have requested such a connection to be provided with normal telephone service when they are not on the Internet.

11 Claims, 2 Drawing Sheets

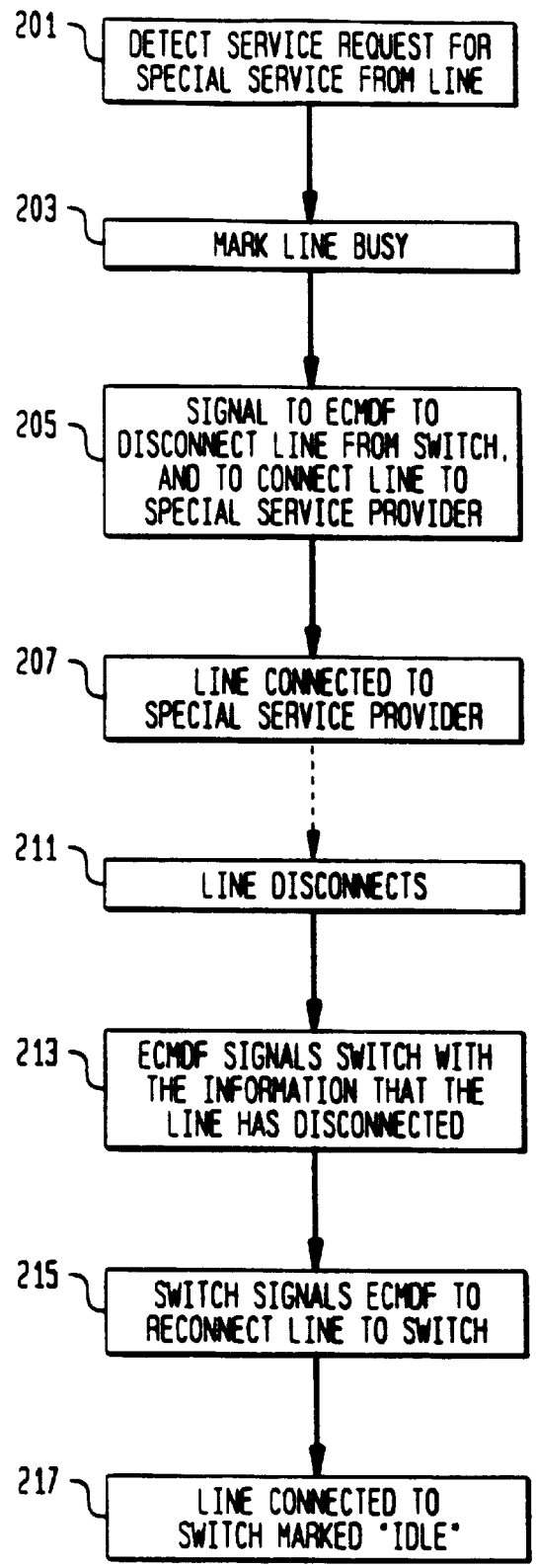

ELECTRONICALLY CONTROLLED MAIN DISTRIBUTING FRAME

TECHNICAL FIELD

This invention relates to arrangements for connecting telecommunications lines to telecommunications switches.

PROBLEM

The use of a main distributing frame between an incoming cable comprising lines connected to telecommunications customers, typically telephone customers, to appropriate input ports of one or more telecommunications switches is very old. The most common form of a main distributing frame is a wiring cross-connect arrangement which allows any of the output ports of the cables connected to a central office to be connected to any of the input ports of one or more central office switches. The main distributing frame is used to connect individual lines to the central office switch serving those lines and to arrange that the traffic from heavy users is appropriately distributed among the input ports of the switch in order to reduce switch access blocking. (The latter function is known as load balancing). The memory of such a main distributing frame is in the wires that form these connections. This memory of such a main distributing frame is in the wires that form these connections. This memory is normally backed up by paper or automated records and the process of keeping such records up to date and routing out errors in such records is a costly one. As a result, it has been estimated that the cost of moving a line from one switch to another both served from the same main distributing frame is between $150.00 and $300.00.

In recent years and in the coming years, the process of load balancing has become even more difficult because the statistics of individual customer usage can fluctuate rapidly and widely. Specifically, if a customer starts becoming a heavy Internet user, the usage of that customer's line may increase five fold or more. Accordingly, a problem of the prior art is that the wiring cross-connect type main distributing frame is expensive to maintain and is insufficiently flexible to serve the more dynamic traffic variations introduced by internet and similar services.

SOLUTION

The above problem is greatly alleviated and an advance is made over the teachings of the prior art in accordance with our invention which uses an Electronically Controlled Main Distributing Frame (ECMDF) comprising an automatically controllable switching network. In applicant's preferred embodiment, the switching network comprises switches having metallic contacts in order to pass DC signals as well as audio and data signals, and is controlled by an electronic controller. In accordance with one feature of applicant's invention, when a customer dials to request a connection to an Internet or similar type of service, the customer is disconnected from the serving switch and is connected instead to a special set of facilities for accessing the Internet or other information service provider. Advantageously, this type of arrangement relieves the central office switch of the dynamic part of its load and allows normal telephone traffic to be switched with minimum blockage, even during periods of very high Internet usage.

In accordance with this feature, in applicant's preferred embodiment the normal connection from the caller to the central office switch through the electronically controlled main distributing frame is dropped and an alternate connection from the caller to a pool of modems is established when the caller dials a number or otherwise indicates a request to be connected to the Internet or other information service provider. In order to detect when such a caller is disconnected from the Internet, such connections are routed through an auxiliary frame which includes means for detecting an on-hook signal; the auxiliary frames interpose between the ECMDF and the modem pool. When the auxiliary frame detects a disconnect is signals to the controller of the ECMDF to re-establish the normal connection between the caller and the central office serving that call. Advantageously, the serving office is used to detect requests for Internet service and to handle normal telephone calls, but is not required to be used for establishing connections to an Internet server.

Many of the lines which are connected to present day switches are connected through subscriber loop carrier systems. Such subscriber loop carrier systems have a remote terminate connected to lines in a central office terminal which re-creates line signals as inputs to a switch and a facility for connecting the remote and the central office terminal. In accordance with another feature of applicant's invention, an auxiliary ECMDF is interposed between the lines and the remote terminal in order to allow a remotely controllable selection of the subscriber loops which are to be connected to a switch. Advantageously, such an arrangement avoids the necessity for making a visit to the remote terminal in order to provide service to a new customer.

Customers on a remote terminal Integrated Services Digital Network (ISDN) service require connection to a different type of line card in the remote terminal. Advantageously, an ECMDF arrangement avoids the necessity for making a visit to a remote terminal in order to upgrade service.

BRIEF DESCRIPTION OF THE DRAWING

FIG. 2 is a flow diagram illustrating a method of applicant's invention.

DETAILED DESCRIPTION

Figure 1:
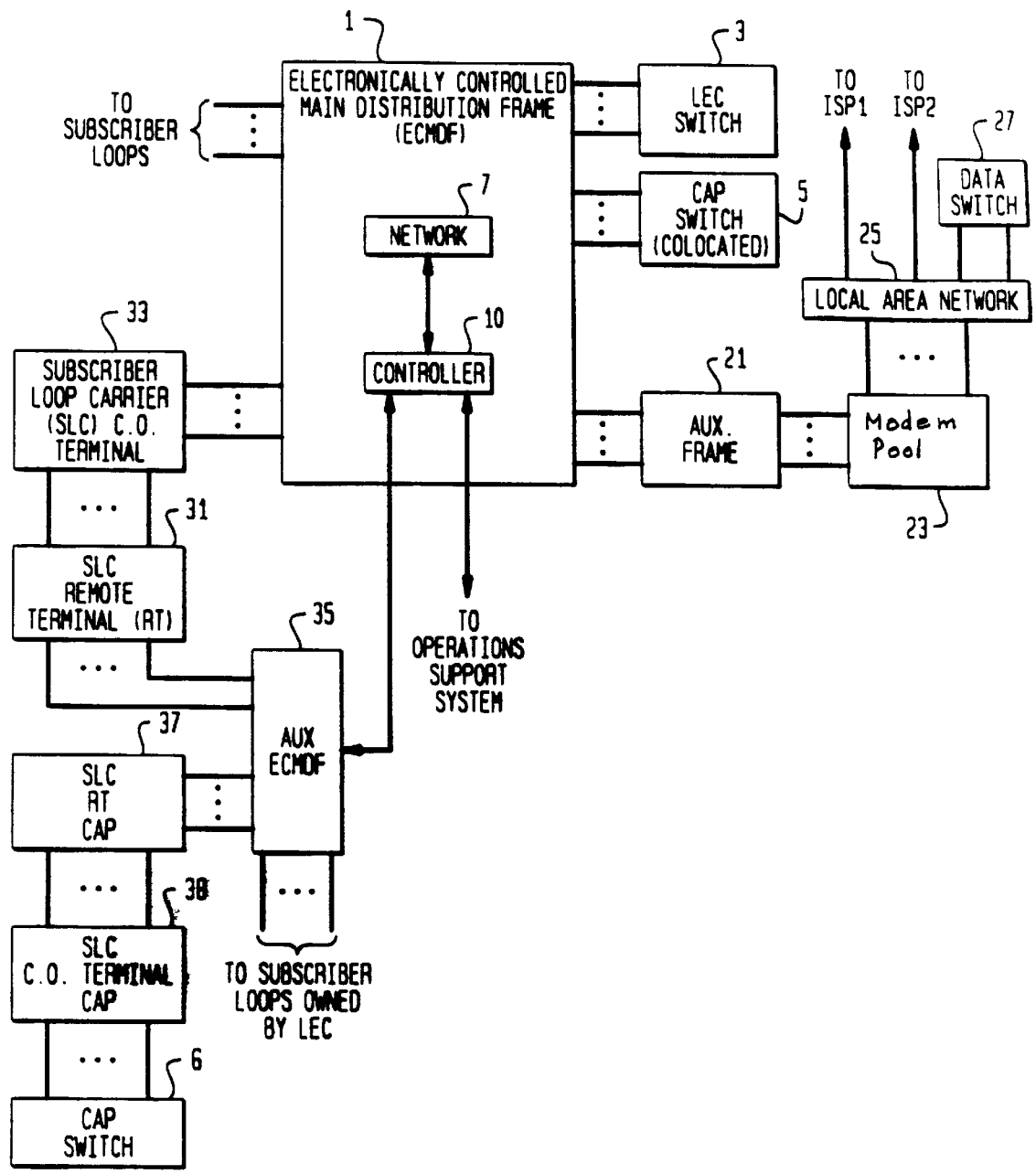
FIG. 1 is a block diagram illustrating applicant's invention.

FIG. 1 is a block diagram illustrating applicant's invention. In applicant's preferred embodiment an electronically controlled in distributing frame (ECMDF) 1 is controlled by a controller 10. The controller 10 is a microprocessor suitably augmented with data links to an operation support system, to auxiliary ECMDF units 35, and to the switches, 3,5 served by the ECMDF. The ECMDF comprises a switching network 7 such as the REM-reed network use in the 1AESS™ switch manufactured by Lucent Technologies. In order to avoid having to make changes in customer equipment and switching equipment in applicant's preferred embodiment the ECMDF comprises such a network which can transmit signals such as DC, 20 Hertz ringing, voice band and multiplexed voice and/or data signals such as ADSL, VDSL, HDSL and IDSL (digital subscriber signals). Clearly, if the switches and the customer stations change, the characteristics of the ECMDF switching network can also change.

The ECMDF is shown in this example to be connected to a local exchange carrier, switch 3, and a competitive access provider, switch 5. The other side of the ECMDF is connected to cables containing customer lines and to the outputs of a central office terminal 33 of a subscriber loop carrier. In its normal function the ECMDF connects these inputs to input terminals of one of the switches.

In accordance with an additional teaching of applicant's invention, the ECMDF is also connected via an auxiliary frame 21 to a pool of modems 23. The modem pool in turn is connected to a local area network 25 which serves as the access to data switches 27 and individual information service providers such as America On-Line. When a line that is connected through the ECMDF dials or otherwise gives an indication of a request to be connected to an information service provider, the switch serving that line sends a message to controller 10 requesting that the line be connected to the modem pool 23. The controller finds a path through the ECDMF for that line, disconnects the line from the serving switch, and connects that line to the modem pool. Subsequently, when that caller disconnects the disconnect is detected in auxiliary frame 21 which signals that disconnect to controller 10. Controller 10 then reestablishes the original connection through the ECMDF between the caller and the switch that serves that call.

Note that in this particular case, the special type of call is a call to an information service provider. The same basic principle can be used to connect callers to any kind of provider of special services, such as voice mail providers. In any such case, the switch detects the request to be connected to a special service provider marks the line as busy signals that connection request to controller 10, and the controller 10 then establishes a new connection through the ECMDF. Controller 10 is then notified of a disconnect either by an auxiliary frame for testing an on-hook signal or by a message from a data link from the special service provider. In response to either of these messages, controller 10 then re-establishes the original connection between the caller and that caller's serving switch.

The switch keeps track of lines which have been temporarily reconnected via the ECMDF to a special service provider. This is to allow for emergency conditions wherein it is important that the caller be reached. If the emergency condition occurs, a message from the emergency bureau causes the line connection to the special service provider to be interrupted by means of a message from the switch to the ECMDF, which then connects the line to its normal position in the switch. Emergency service can then be provided.

The ECMDF is also connected to central office terminal 33 which provides line signals representing lines connected to a SLC remote terminal 31 (SLC-RT). In accordance with applicant's invention, between the loops going to subscriber and the SLC-RT 31 is interposed an auxiliary ECMDF controlled by controller 10. In response to a request from an operations support system (not shown) to the controller 10, the auxiliary ECMDF establishes a connection between a specified subscriber loop and a specified input to the SLC-RT 31 in order to provide service to a new customer; similarly, in response to a "remove service" request from the operation support system, the controller 10 gives instructions to Auxiliary ECMDF 35 to remove a connection between a specified subscriber loop and a specified SLC-RT input terminal. The ECMDF can also be used to add or remove special circuits, such as voice and/or data multiplexing circuits, into a loop circuit. This eliminates the need for dispatching a craftsperson to the remote terminal for every change, as is required today.

The auxiliary ECMDF 35 is also connectable to a SLC-RT 37 belonging to a noncolocated competitive access provider (CAP), and via unit 37, and its corresponding SL-COT unit 38, to a noncolocated CAP switch 6. In the preferred embodiment, only a single source of control, controller 10, is used for controlling unit 35, because it is expected that all the loops connected to that unit are owned by the owner of the ECMDF.

Advantageously, the service logic for the special service connection is located in the switch. This allows the switch to provide emergency services for the subscriber's line. In the existing art, devices such as key switches have been used to redirect data calls, but the public switch emergency actions such as busy verify no longer work.

FIG. 2 is a flow diagram illustrating the operation of a change in the connection within the ECMDF in response to a caller's request for special service. Special service in this case might be a service such as a connection to the Internet. Such a connection is advantageously provided in accordance with applicant's invention by switching the customer's line directly to one of a pool of modems for connection to the Internet. In applicant's preferred embodiment, this function is performed by connecting the requesting line to an auxiliary frame 21 which then connects to the modem pool 23.

The process begins when the caller makes a request for the special service. This request is detected by the switch (Action Block 201) which marks the line "busy" (Action Block 203). The switch signals to the ECMDF to disconnect the line from the switch and connect the line to the auxiliary frame for subsequent connection to the special service provider. (Action Block 205). The line is connected to a special service provider (Action Block 207). The switch maintains a record of this connection; if subsequently there is, for example, a line verification request, the switch will have the information describing the special connection. At some time later, the line disconnects (Action Block 211). The ECMDF receives a signal that the disconnect has occurred and signals the switch that the disconnect has occurred (Action Block 213). The switch then signals to the ECMDF to reconnect the line to the switch and disconnect it from the special service provider (Action Block 215). The line is then connected to the switch and marked "idle", (Action Block 217) so that it can initiate or receive new calls.

Both the switch or an operations support system (not shown) and the ECMDF maintain records of connections up in the ECMDF. The support system may maintain records of long term connections while the switch maintains records of temporary connections. The records of the ECMDF can be used to audit the records of the other source, and vice versa.

While in the preferred embodiment, the ECMDF 1 is shown as a unit separate from the local switch 3, it is possible to use a single controller for controlling both the ECMDF and local band switch 3, and to integrate the networks of these two units provided the integrated network includes the capability of switching the required signals. The remote terminal 31 can also be integrated with auxiliary ECMDF 35.

The above is one embodiment of applicants' invention. Many other embodiments will be apparent to those of ordinary skill in the art. The invention is therefore, limited only by the attached claims.

We claim:

1. An ECMDF, (electronically controlled main distributing frame) comprising:
   a switching network; and
   a controller;
   said switching network comprising switching means for transmitting direct current signals over ones of paths through said switching network;
   said switching network for connecting subscriber loop means with a local switch;
   said controller responsive to signals received from said local switch for establishing connections through said switching network;

said switching network further for connecting ones of said subscriber loop means to means for communicating with special service providers;

said local switch responsive to a request, received over a subscriber loop, for connecting said subscriber loop to a special service provider, for generating signals to said controller for disconnecting said subscriber loop from said local switch and connecting said subscriber loop to said means for communicating with special service providers;

said controller, responsive to a disconnect request received over said subscriber loop, for notifying said local switch;

said controller, responsive to a signal from said local switch, for disconnecting said subscriber loop from said means for communicating with special service providers and reconnecting said subscriber loop to said local switch;

wherein subscribers dialing instructions requesting a connection to a special service provider can be automatically disconnected from said local switch and directly connected to equipment for accessing said special service providers in response to said local switch receiving said dialing instructions.

2. The ECMDF of claim 1 wherein said means for accessing special service providers comprises apparatus for accessing the Internet network.

3. The ECMDF of claim 1 wherein said controller is further responsive to signals from said means for accessing special service providers for disconnecting a connection to such special service providers and reestablishing a connection to said local switch.

4. The ECMDF of claim 1 wherein said network is further connectable to a competitive access provider local switch and wherein said controller is responsive to received signals for establishing a connection between loop means for a particular subscriber and said competitive access provider local switch.

5. An ECMDF, (electronically controlled main distributing frame) comprising:

a switching network; and a controller;

said switching network comprising switching means for transmitting direct current signals over ones of paths through said switching network;

said switching network for connecting subscriber loop means with a local switch;

said controller responsive to signals received from said local switches for establishing connections through said switching network;

said switching network further connectable to means for communicating with special service providers;

said controller responsive to signals received from said local switch for disconnecting a subscriber loop from said local switch and connecting said subscriber loop to said means for communicating with special service providers;

whereby subscribers dialing instructions requesting a connection to a special service provider can be automatically disconnected from said local switch and directly connected to equipment for accessing said special service providers;

wherein said controller further communicates with an auxiliary ECMDF for establishing connections between subscriber loops and remote subscriber loop systems.

6. The ECMDF of claim 5 wherein said remote subscriber loop systems comprise subscriber loop carrier remote terminals.

7. The ECMDF of claim 5 wherein said remote loop systems comprise remote loop systems for communicating with a local switch of a competitive access provider without going through said network of said ECMDF.

8. An ECMDF, (electronically controlled main distributing frame) comprising:

a switching network; and a controller;

said switching network comprising switching means for transmitting direct current signals over ones of paths through said switching network;

said switching network for connecting subscriber loop means with a local switch;

said controller responsive to signals received from said local switches for establishing connections through said switching network;

said switching network further connectable to means for communicating with special service providers;

said controller responsive to signals received from said local switch for disconnecting a subscriber loop from said local switch and connecting said subscriber loop to said means for communicating with special service providers;

whereby subscribers dialing instructions requesting a connection to a special service provider can be automatically disconnected from said local switch and directly connected to equipment for accessing said special service providers;

wherein said ECMDF is further responsive to a request from said local switch for disconnecting said subscriber loop from said means for communicating with special service providers and connecting said subscriber loop to said local switch;

whereby a line may be restored to the local switch for emergency services.

9. An ECMDF, (electronically controlled main distributing frame) comprising:

a switching network; and a controller;

said switching network comprising switching means for transmitting direct current signals over ones of paths through said switching network;

said switching network for connecting subscriber loop means with a local switch;

said controller responsive to signals received from said local switches for establishing connections through said switching network;

said switching network further connectable to means for communicating with special service providers;

said controller responsive to signals received from said local switch for disconnecting a subscriber loop from said local switch and connecting said subscriber loop to said means for communicating with special service providers;

whereby subscribers dialing instructions requesting a connection to a special service provider can be automatically disconnected from said local switch and directly connected to equipment for accessing said special service providers;

wherein said controller is further responsive to signals from said local switch for bridging said connection to said means for communicating with special service providers to test equipment connected to said local switch.

10. An ECMDF, (electronically controlled main distributing frame) comprising:

a switching network; and a controller;

said switching network comprising switching means for transmitting direct current signals over ones of paths through said switching network;

said switching network for connecting subscriber loop means with a local switch;

said controller responsive to signals received from said local switches for establishing connections through said switching network;

said switching network further connectable to means for communicating with special service providers;

said controller responsive to signals received from said local switch for disconnecting a subscriber loop from said local switch and connecting said subscriber loop to said means for communicating with special service providers;

whereby subscribers dialing instructions requesting a connection to a special service provider can be automatically disconnected from said local switch and directly connected to equipment for accessing said special service providers;

wherein said controller maintains a record of which lines are connected to said means for communicating with special service providers and transmits a message comprising said record to said local switch for verification by said local switch.

11. An ECMDF, (electronically controlled main distributing frame) comprising:

a switching network; and a controller;

said switching network comprising switching means for transmitting direct current signals over ones of paths through said switching network;

said switching network for connecting subscriber loop means with a local switch;

said controller responsive to signals received from said local switches for establishing connections through said switching network;

said switching network further connectable to means for communicating with special service providers;

said controller responsive to signals received from said local switch for disconnecting a subscriber loop from said local switch and connecting said subscriber loop to said means for communicating with special service providers;

whereby subscribers dialing instructions requesting a connection to a special service provider can be automatically disconnected from said local switch and directly connected to equipment for accessing said special service providers;

wherein said controller maintains a record of all connections in said ECMDF and provides an output comprising segments of or all of said record;

whereby maintenance and business records are verified by comparison with said record.

* * * * *